(12) United States Patent
Oprasic et al.

(10) Patent No.: US 8,882,405 B2
(45) Date of Patent: Nov. 11, 2014

(54) DOUBLE-SIDED INDEXABLE FACE MILLING INSERT

(75) Inventors: Amil Oprasic, Sandviken (SE); Lennart Wihlborg, Ockelbo (SE); Leif Widin, Sandviken (SE); Stefan Roman, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 1373 days.

(21) Appl. No.: 12/619,249

(22) Filed: Nov. 16, 2009

(65) Prior Publication Data
US 2010/0150671 A1 Jun. 17, 2010

(30) Foreign Application Priority Data
Dec. 17, 2008 (SE) ...................................... 0850145

(51) Int. Cl.
B23C 5/02 (2006.01)
B23C 5/20 (2006.01)
B23C 5/22 (2006.01)

(52) U.S. Cl.
CPC ............... *B23C 5/207* (2013.01); *B23C 5/2208* (2013.01); *B23C 2200/083* (2013.01); *B23C 2200/125* (2013.01); *B23C 2200/162* (2013.01); *B23C 2200/208* (2013.01); *B23C 2210/166* (2013.01); *B23C 2210/168* (2013.01)
USPC ................................ 407/42; 407/113; 407/61

(58) Field of Classification Search
CPC ........................................................ B23C 5/02
USPC ............ 407/113, 34, 115, 116, 42, 47, 48, 61
See application file for complete search history.

(56) References Cited

U.S. PATENT DOCUMENTS 3,694,876 A * 10/1972 Erkfritz ........................... 407/48
3,955,259 A * 5/1976 Gustafsson ..................... 407/37
(Continued)

FOREIGN PATENT DOCUMENTS

CN 102131606 A 7/2011
DE 20 2005 009 521 U1 11/2005
(Continued)

OTHER PUBLICATIONS

European Search Report for Application No. 09176098.3, dated Apr. 2, 2012.
(Continued)

*Primary Examiner* — Andrea Wellington
*Assistant Examiner* — Sara Addisu
(74) *Attorney, Agent, or Firm* — Morgan, Lewis & Bockius LLP

(57) ABSTRACT

A double-sided, indexable face milling insert, including an upperside, an underside, and a neutral plane (NP) parallel to the upperside and the underside, the neutral plane forming a right angle with a geometrical center axis (C2). A plurality of indexable cutting edges are formed along circumferential borderlines in transitions between a number of clearance surfaces and the upperside as well as the underside. Each cutting edge includes a chip-removing main edge and a surface-wiping secondary edge, the secondary edge forming an obtuse angle with the main edge in planar view. A corner clearance surface extends between and connects each pair of upper and lower secondary edges, the corner clearance surface including first and second part surfaces which each form an acute angle ($\eta$) in side elevation view with respective reference planes (RP) parallel to the neutral plane.

18 Claims, 9 Drawing Sheets

(56) References Cited

U.S. PATENT DOCUMENTS

| | | | |
|---|---|---|---|
| 4,569,619 A * | 2/1986 | Newton | 407/15 |
| 4,616,962 A * | 10/1986 | Ushijima et al. | 407/113 |
| 5,443,334 A * | 8/1995 | Pantzar | 407/113 |
| 5,454,670 A | 10/1995 | Noda et al. | |
| 5,692,860 A * | 12/1997 | Kramer | 407/34 |
| 5,807,031 A | 9/1998 | Arai et al. | |
| 6,273,651 B1 | 8/2001 | Heinloth et al. | |
| 6,503,028 B1 * | 1/2003 | Wallstrom | 407/35 |
| 6,543,970 B1 | 4/2003 | Qvarth et al. | |
| 7,040,844 B1 * | 5/2006 | Daiguji | 407/113 |
| 7,232,279 B2 | 6/2007 | Smilovici et al. | |
| 7,306,409 B2 | 12/2007 | Stabel et al. | |
| 7,419,338 B2 | 9/2008 | Smilovici et al. | |
| 7,431,540 B2 * | 10/2008 | Lof et al. | 407/113 |
| 7,578,641 B2 * | 8/2009 | Andersson et al. | 407/113 |
| 7,677,845 B2 * | 3/2010 | Limell et al. | 408/223 |
| 7,909,546 B2 * | 3/2011 | Nada et al. | 407/114 |
| 8,157,489 B2 * | 4/2012 | Wolf et al. | 408/223 |
| 8,206,066 B2 | 6/2012 | Men et al. | |
| 8,337,123 B2 * | 12/2012 | Ishida | 407/42 |
| 8,419,319 B2 * | 4/2013 | Hatta | 407/113 |
| 8,449,230 B2 * | 5/2013 | Nguyen et al. | 409/132 |
| 8,485,765 B2 * | 7/2013 | Kruszynski et al. | 408/223 |
| 8,491,234 B2 * | 7/2013 | Fang et al. | 407/113 |
| 2006/0269366 A1 * | 11/2006 | Rieth | 407/113 |
| 2008/0260475 A1 | 10/2008 | Bodewig | |
| 2011/0236147 A1 | 9/2011 | Bodewig | |

FOREIGN PATENT DOCUMENTS

| | | |
|---|---|---|
| JP | 48-84967 | 11/1973 |
| JP | 58-51011 | 3/1983 |
| JP | 62 39106 A | 2/1987 |
| JP | 2-53303 | 4/1990 |
| JP | H02 53303 U | 4/1990 |
| JP | 9-216113 | 8/1997 |
| JP | 2001-157904 | 6/2001 |
| JP | 2001-515797 | 9/2001 |
| JP | 2003-53620 | 2/2003 |
| JP | 2006-224278 | 8/2006 |
| JP | 2008-544872 | 12/2008 |
| JP | 2009-501646 | 1/2009 |
| WO | WO 2007/009650 A1 | 1/2007 |

OTHER PUBLICATIONS

Official Action for Swedish Patent Application No. 0850145-4, dated Jun. 8, 2009.

Notification of First Office Action (with English translation) for Chinese Patent Application No. 200910253768.9, dated Feb. 27, 2013.

Notice of Reasons for Rejection (with English translation) for Japanese Patent Application No. 2009-286864, dated Nov. 5, 2013.

* cited by examiner

DOUBLE-SIDED INDEXABLE FACE MILLING INSERT

This application claims priority under 35 U.S.C. §119 to Swedish Patent Application No. 0850145-4, filed on Dec. 17, 2008, which is incorporated by reference herein in its entirety.

FIELD OF THE INVENTION

The present invention relates generally to a double-sided and indexable face milling insert of the type that includes an upperside and an underside, a neutral plane parallel to the same, as well as a plurality of alternately applicable cutting edges, which are formed along circumferential borderlines in transitions between a number of clearance surfaces and the upperside as well as the underside, and which individually include a chip-removing main edge and a surface-wiping secondary edge, which—as viewed in planar view—forms an obtuse angle with the main edge.

BACKGROUND OF THE INVENTION

Milling tools for chip removing machining of, above all, workpieces of metal (steel, aluminium, titanium, etc.) are generally composed of a rotatable basic body or milling cutter body, most often of steel, as well as a plurality of replaceable milling inserts of cemented carbide, ceramics or the like. Because the milling inserts are articles of consumption as a consequence of the fact that they are worn fairly fast, it is most often desirable to form the same with as large a number of cutting edges as possible. For this reason, the milling inserts may be made double-sided so far that the underside is formed with the same number of cutting edges as the upperside, while doubling of the number of cutting edges in comparison with single sided milling inserts. Therefore, milling cutters for face milling are often equipped with milling inserts that are double-sided and have a quadratic basic shape with four cutting edges, i.e., four pairs of co-operating main edges and secondary edges, along the upperside as well as the underside, and which are mounted at an effective setting angle of approximately 45° in the milling cutter body. In such cases, the main edge and the secondary edge form an angle of 135° with each other.

Problems forming the basis of the present invention are associated with double-sided face milling inserts of the type that is denominated "negative", and which are formed with clearance surfaces that extend perpendicularly to the neutral plane to which the uppersides and undersides are parallel. In order to provide requisite clearance between, on one hand, the clearance surface rotationally present behind the active, surface-wiping secondary edge, and, on the other hand, the generated, plane surface of the workpiece, the milling insert is mounted with a negative axial tipping-in angle in the milling-cutter body. At the same time, the milling insert is also given a negative radial tipping-in angle in order to provide clearance between, on one hand, the clearance surface behind the chip-removing main edge, and, on the other hand, the generally cone-shaped surface generated by the same. The negative axial tipping in of the milling insert gives rise to, on one hand, greater axial cutting forces than those cutting forces that arise when the milling inserts are positively tipped in, and, on the other hand, difficult-to-master problems with the chip formation as well as the chip evacuation, among other things so far that the chips tend to be directed obliquely downward toward the generated plane surface rather than escaping therefrom.

Before the background of the invention is additionally described, it should be pointed out that certain fundamental concepts found in this document, e.g., "clearance angle", can be of either a nominal or an effective character. When, for instance, a clearance angle is "nominal", the same only relates to the milling insert as such, i.e., without conjunction with the milling cutter body, but if the same is "effective", reference is made to the clearance angle that occurs when the milling insert is mounted in the rotatable milling cutter body to undertake chip removal.

The problems caused by the negative axial and radial tipping-in, respectively, are particularly accentuated in milling cutters having older type milling inserts, which have a prismatic basic shape and include cutting edges, the main edges of which are straight and pair-wise parallel along their common clearance surfaces, as are also the secondary edges straight and pair-wise parallel along the common clearance surfaces thereof. In this case, the main edges become particularly blunt-cutting and give rise to pronounced chip formation and chip evacuation problems, because they have to be tipped in at a great negative axial angle to give the desired, efficient clearance angle between the generated plane surface of the workpiece and the clearance surface behind the surface-wiping secondary edge.

More recently, a number of proposals of solutions of the above-mentioned problems have appeared. Thus, in U.S. Pat. No. 5,807,031, a double-sided, quadratic face milling insert is disclosed, the chip-removing main edges of which are nominally inclined in relation to the neutral plane of the milling insert, more precisely in such a way that the individual main edge, counted from a first end adjacent to the co-operating secondary edge, first declines toward the underside of the milling insert and then, from a lowest point, again rises toward an opposite end. In such a way, the above-mentioned problems are solved in a general way, so far that the effective axial angle of the proper main edge is reduced from a relatively great negative value to a smaller, more positive value, in spite of the milling insert, per se, (i.e., the neutral plane of the milling insert) having a sufficiently great negative axial angle in order to provide the requisite clearance behind the surface-wiping secondary edge. However, this known milling insert is, nevertheless, associated with a number of shortcomings and disadvantages. One such disadvantage is that the clearance surfaces of the secondary edges—like the corresponding clearance surfaces of the older milling inserts—are plane and extend perpendicularly to the neutral plane of the milling insert. This means that the milling insert, to give a sufficient effective clearance immediately behind the active secondary edge, still requires an axially negative tipping-in angle that is fairly great. Another disadvantage is that the two secondary edges along a common clearance surface at each corner of the milling insert are mutually parallel. This means that the transition between the individual secondary edge and the appurtenant main edge forms a fairly sharp or "bobish" corner (as viewed nominally in side view), so far that the angle between the secondary edge and the declining main edge is considerably smaller than 180°. Thus, in the preferred embodiment, this angle amounts to 165°-170°. Because the corner transition between the main edge and the secondary edge is the part of the milling insert that is absolutely most exposed to, among other things, forces, heat and erosion, the fairly distinct bob on the same means that the milling insert becomes fragile and gets a limited service life. In addition, the wear of the bob gives easy rise to visible stripes in the completed, wiped-off surface, more precisely in the form of per se shallow, but nevertheless most detrimental grooves in the surface being plane in other respects. In other words, the finish of the generated surface becomes rather mediocre.

A face milling insert which resembles the milling insert described above and which essentially is impaired with the same disadvantages as the same is previously known by U.S. Pat. No. 7,306,409.

The present invention aims at obviating the above-mentioned disadvantages of the previously known face milling inserts and at providing an improved face milling insert.

An object of the invention to provide a double-sided face milling insert, the axially negative tipping-in angle of which in the milling cutter body is reduced to an absolute minimum while optimizing the performance of the milling tool.

Another object of the invention is to provide a face milling insert, in which the desired, cutting-technical improvements can be attained without the milling insert being weakened by unnecessary reduction of the amount of material (cemented carbide) in the same.

In addition, the design of the milling insert should offer the possibility of adapting the clearance under the secondary edge to specific applications in which the machined material requires an enlarged clearance, without the mounting of the milling insert in the milling cutter body being affected.

Yet another object of the invention is to provide a face milling insert that can be manufactured by pressing and sintering of, e.g., cemented carbide powder, without the design of the milling insert making the process more difficult and/or detrimentally affecting the surface quality of the milling insert. Most suitably, the milling insert should be possible to be directly pressed, i.e., obtain the final shape thereof without grinding.

SUMMARY OF THE INVENTION

In an embodiment, the invention provides a double-sided, indexable face milling insert, including an upperside, an underside, and a neutral plane (NP) parallel to the upperside and the underside, the neutral plane forming a right angle with a geometrical center axis (C2). A plurality of indexable cutting edges are formed along circumferential borderlines in transitions between a number of clearance surfaces and the upperside as well as the underside. Each cutting edge includes a chip-removing main edge and a surface-wiping secondary edge, the secondary edge forming an obtuse angle with the main edge in planar view. A corner clearance surface extends between and connects each pair of upper and lower secondary edges, the corner clearance surface including first and second part surfaces which each form an acute angle ($\eta$) in side elevation view with respective reference planes (RP) parallel to the neutral plane.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
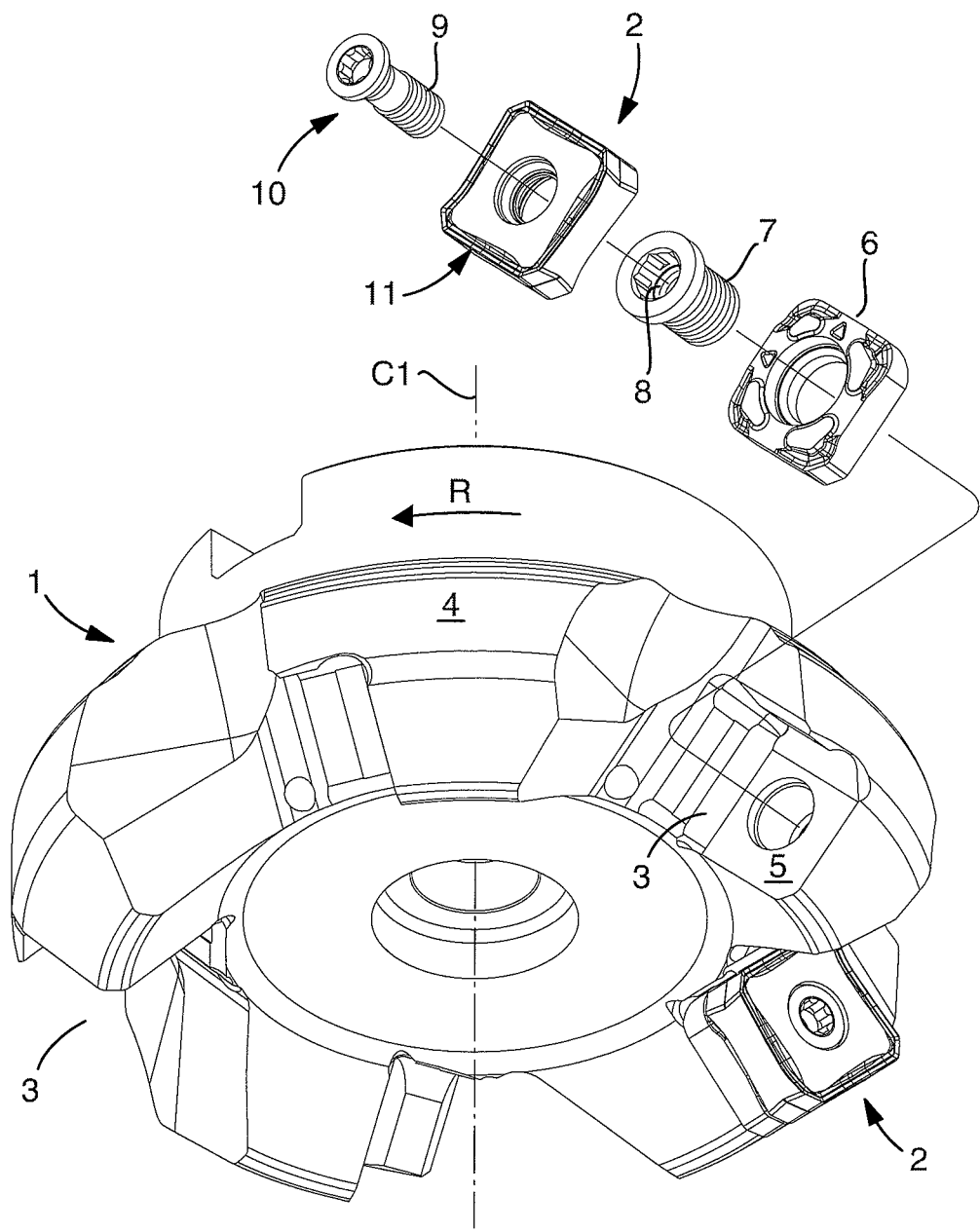
FIG. 1 is a perspective exploded view showing a milling tool in the form of a face mill, which is equipped with milling inserts according to an embodiment of the invention.
Figure 2:
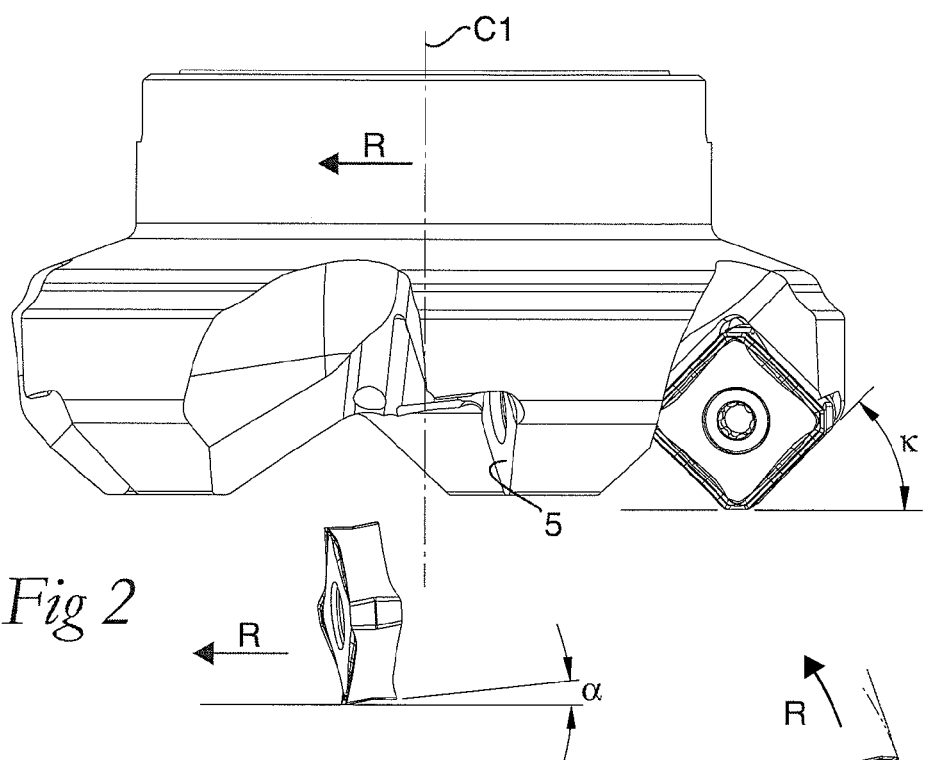
FIG. 2 is a side view of the basic body of the milling cutter having the purpose of illustrating the result of the axial tipping in of the individual milling insert in the milling cutter body.
Figure 3:
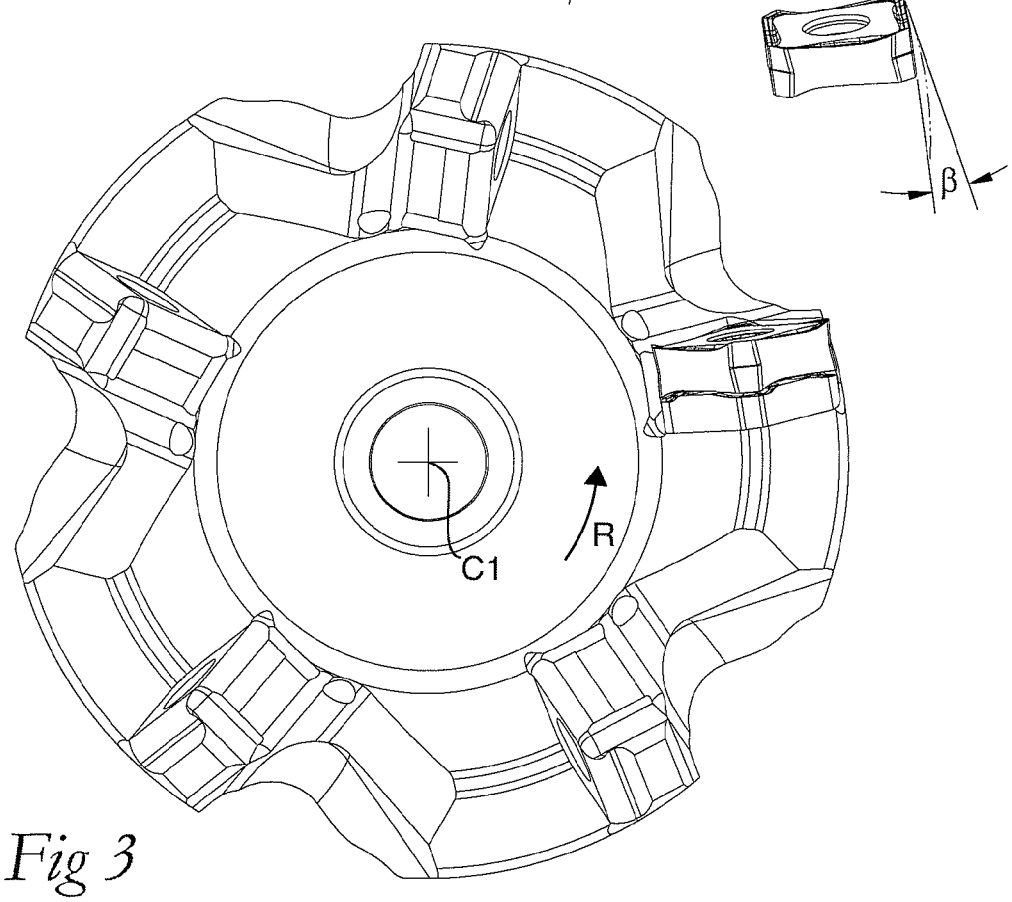
FIG. 3 is a planar view from below having the purpose of illustrating the result of the radial tipping in of the milling insert.

In FIGS. 1-3, a milling tool is exemplified in the form of a face mill, which is composed of a basic body or milling cutter body 1 and a number of replaceable milling inserts 2. The milling cutter body 1 is rotatable in the direction of rotation R around a center axis designated C1, and includes, in a front or lower end, a number of chip pockets 3 for each one of the milling inserts 2. In the example, the number of chip pockets amounts to five. The chip pockets 3 are recessed in a rotationally symmetrical envelope surface 4 and include a seating or insert seat, which is represented by a planar bottom surface 5. Although it is fully possible to apply the individual milling insert directly against the bottom surface 5, in this case a shim plate 6 is arranged between the bottom surface 5 and the milling insert 2. This shim plate is kept semi-permanently fixed against the bottom surface 5 by a tube screw 7, in the female thread 8 of which a male thread 9 of a screw 10 can be tightened for the fixation of the proper milling insert 2.

Figure 4:
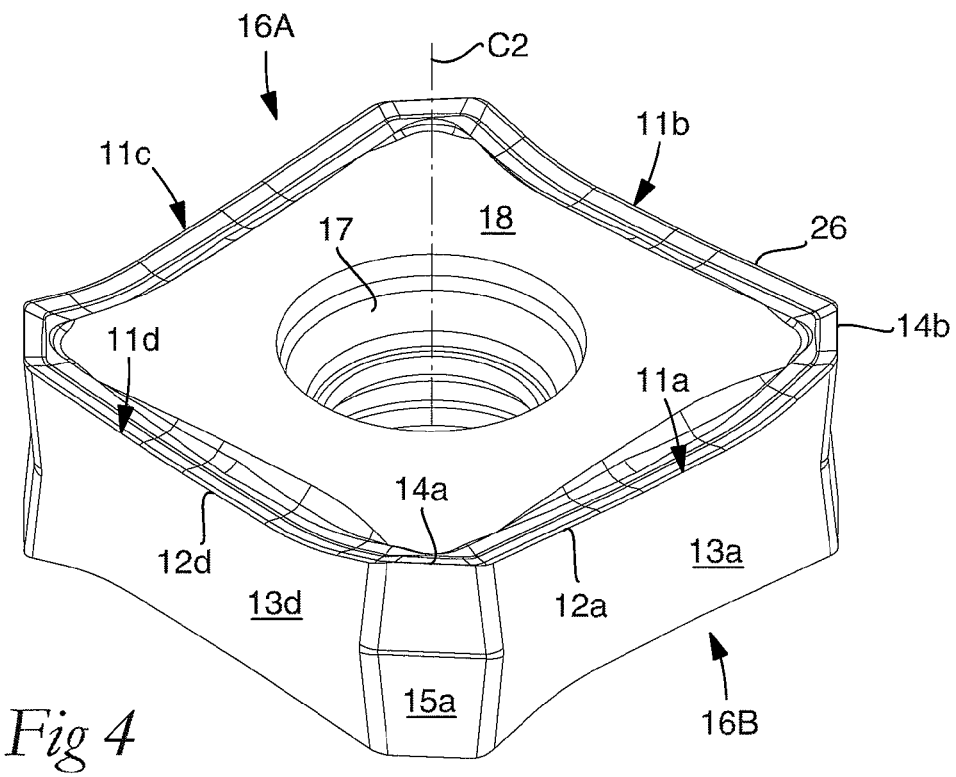
FIG. 4 is a top side view showing the upperside of the milling insert.
Figure 5:
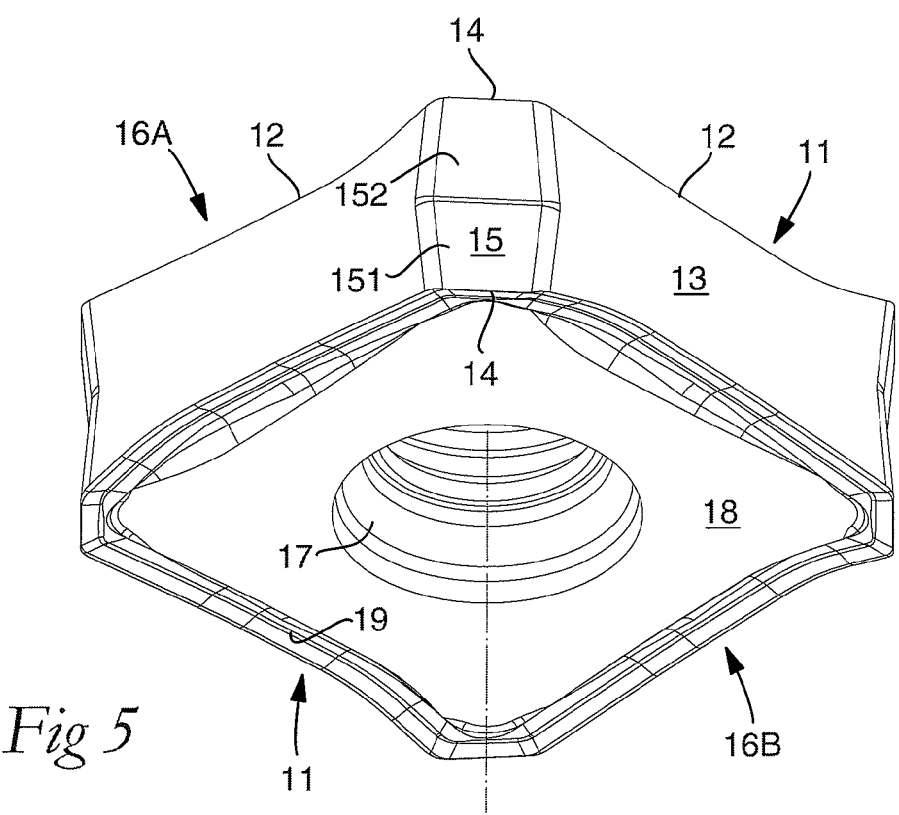
FIG. 5 is a bottom side view showing the identical underside of the milling insert.

As is seen more clearly in FIGS. 4 and 5, the milling insert 2 has a square basic shape and includes four cutting edges 11, each one of which includes a chip-removing main edge 12 adjacent to a first clearance surface 13, as well as a surface-wiping secondary edge 14 (at times denominated "wiper edge") adjacent to a second clearance surface or corner surface 15. Because the milling insert is double-sided, the same is mounted in an adapted tipping-in position in the milling cutter body 1. Thus, in FIG. 2, it is seen how the bottom surface 5, which ultimately determines the solid-geometrical position of the milling insert 2 in the milling cutter body 1, does not run parallel to the center axis C1, but is tipped downward/forward in relation to the center axis C1 and the direction of rotation R. In such a way, an effective clearance is provided between the clearance surface 15 being present under, or rotationally behind, the secondary edge 14 and the planar surface which is generated and leveled out by the secondary edge 14. In order to, in an analogous way, provide a clearance between the clearance surface 13 of the main edge 11 and the cone-shaped surface generated by the main edge, the bottom surface 5 is in addition tipped in at a radially negative tipping-in angle (see FIG. 3). In order for the clearance of the surface 15 to be well functioning, the axial tipping-in angle should amount to at least 4°, but may be greater. In the example, the axial tipping-in angle amounts to 6°, which yields an effective clearance angle α of approx. 6° (see FIG. 2). The effective clearance angle α is also affected by the radial tipping-in angle, though marginally. The radial tipping-in angle may amount to 8° or more. The axial and radial tipping-in angles together determine the effective clearance angle β behind the main edge (see FIG. 3). Suitably, β should be within the range of 8°-20°.

It should be pointed out that the milling cutter body 1 suitably is manufactured of steel or aluminium, while the replaceable milling inserts 2 are manufactured of cemented carbide, ceramics, or other hard and wear-resistant materials.

Reference is now made to FIGS. 4-12, which in detail illustrate only the proper milling insert 2, i.e., without conjunction with the milling cutter body 1. The milling insert includes an upperside 16A and an underside 16B (see FIGS. 7 and 11), the topographic or cutting geometrical design of which corresponds with the design of the upperside 16A. Generally, the upperside and the underside are parallel to a neutral plane NP, which is situated halfway between the same. The neutral plane NP extends perpendicularly to the geometrical center axis C2 of the milling insert, which in this case, when the milling insert is formed with a through hole 17 for the screw 10, also forms a center axis of the same hole. As previously has been pointed out, the milling insert has a quadratic basic shape and includes four cutting edges 11, each one of which includes a main edge 12 and a surface-wiping secondary edge 14. In FIG. 4, certain of the reference designations 11, 12, 13 and 14 are provided with the suffixes a, b, c and d to separate the cutting edges from each other. The corresponding reference designations in FIG. 5 lack such suffixes. In FIG. 4, a first cutting edge 11a is meant to be active, the main edge 12a and the secondary edge 14a co-operating with each other during the milling operation, while the three other cutting edges (second, third and fourth), designated 11b, 11c, 11d, are inactive. In FIG. 4, the active main edge 12a is shown adjoining to an inactive secondary edge 14b at the same time as the active secondary edge 14a adjoins to an inactive main edge 12d.

In the upperside 16A as well as the underside 16B, a planar surface 18 is included, which forms the contact or base surface of the milling insert against the shim plate 6. Peripherally outside the contact surface 18, chip surfaces 19 are formed, which together with the upper portions of the clearance surfaces 13, 15 delimit the different cutting edges. In order to separate the clearance surfaces 13, 15 adjacent to the active cutting edge 11a, the same surfaces have been provided with the suffix a in FIG. 4. In this connection, it should also be pointed out that the reference designations 12, 14 point at the cutting-edge lines formed in the transitions between the clearance surfaces and the chip surfaces.

Figure 6:
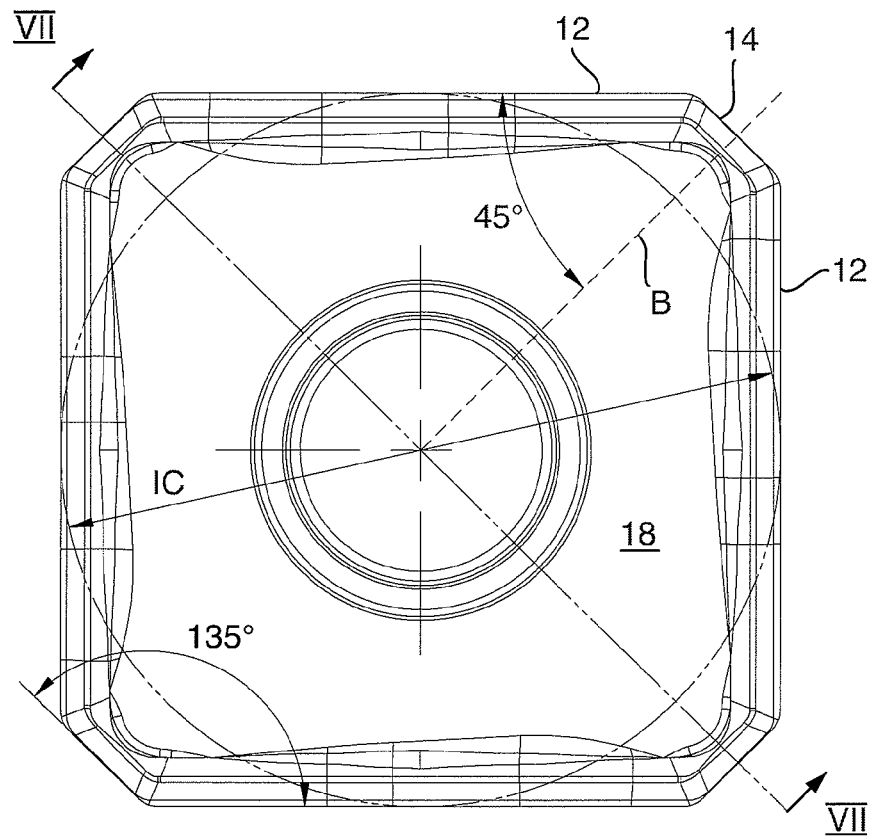
FIG. 6 is a planar view from above of the milling insert.
Figure 7:
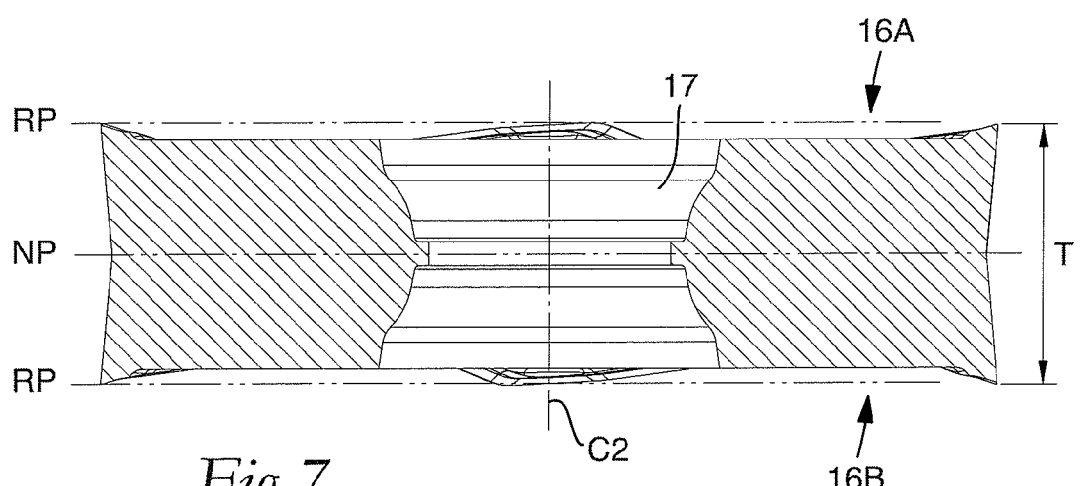
FIG. 7 is a section VII-VII in FIG. 6.

Because the effective setting angle κ (see FIG. 2) of the milling cutter in this case should amount to approximately 45°, the pair-wise co-operating secondary and main edges 14, 12 form an obtuse angle of 135° with each other as viewed in planar view (see FIG. 6). Furthermore, the secondary edge 14 extends perpendicularly to a bisector B, which in turn forms an angle of 45° with each pair of main edges 12 and clearance surfaces 13 running toward a common, individual corner of the milling insert.

Figure 10:
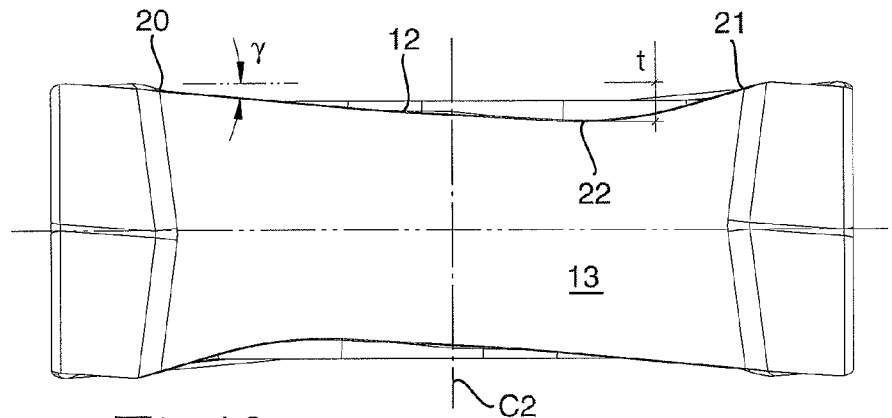
FIG. 10 is an enlarged side view of the milling insert.
Figure 11:
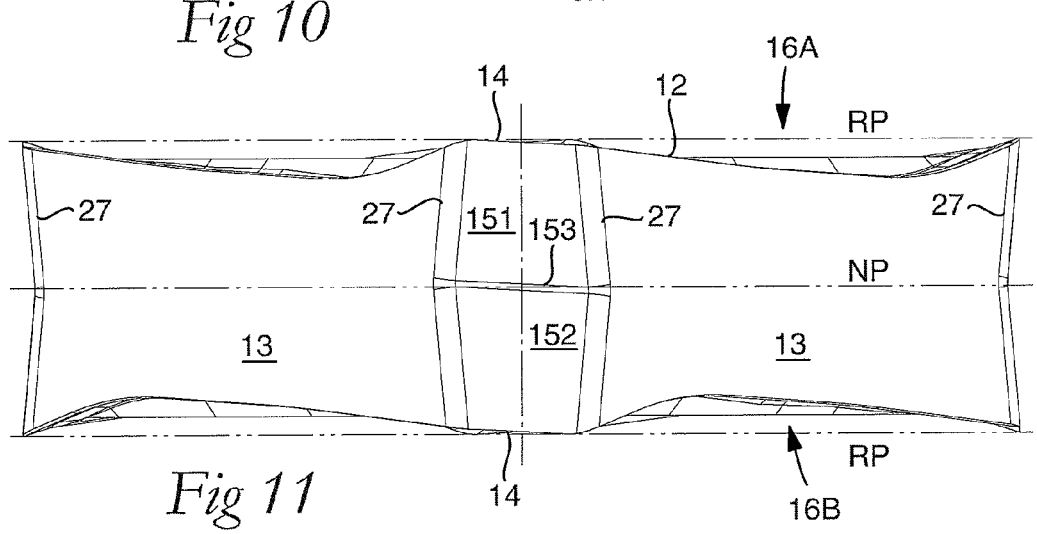
FIG. 11 is a side view showing the milling insert diagonally in the direction of the bisector of the individual corner.

In FIG. 10 it is seen that the individual main edge 12 extends between first and second ends 20, 21. From the first end 20, the main edge declines in the downward direction toward the underside 16B of the milling insert, more precisely at an angle γ, in order to subsequently, from a lowest point 22, again rise toward the opposite second end 21. In FIG. 11, RP designates two reference planes parallel to the neutral plane NP.

According to the embodiment, the corner surface 15, which extends between each individual pair of upper and lower secondary edges 14 and serves as a clearance surface, is formed with upper and lower part surfaces 151, 152 (see also FIG. 8), which form an acute angle η with each reference plane RP. In the example, said angle η amounts to 85°, involving that the complementary angle θ amounts to 5°.

Figure 8:
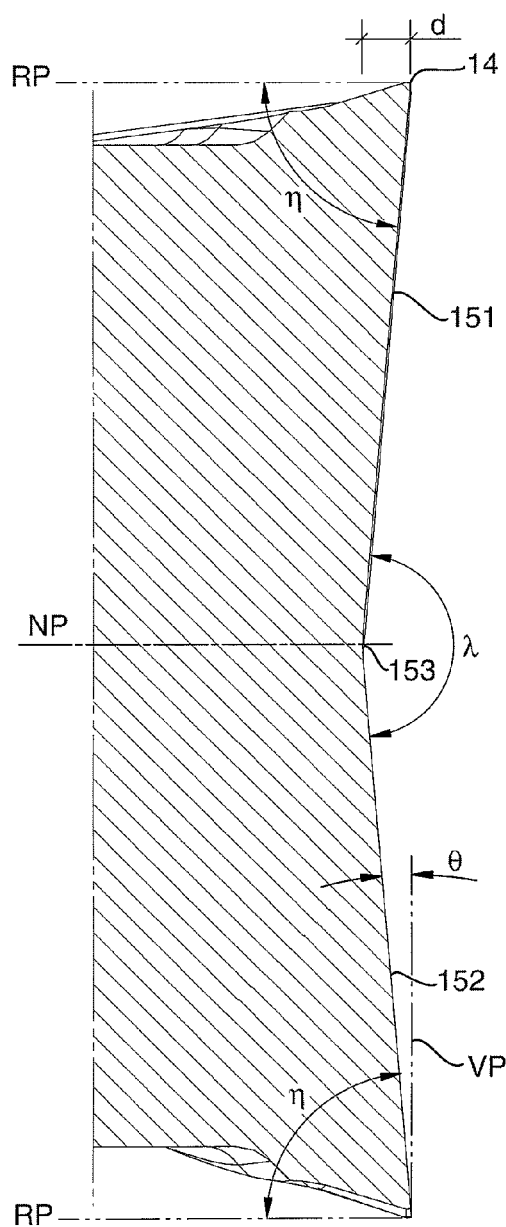
FIG. 8 is an enlarged detailed section through a corner of the milling insert, showing the design of the clearance surface between a pair of upper and lower secondary edges.

In the embodiment shown in FIG. 8, the two part surfaces 151, 152 are planar and transform into each other via a borderline 153, which advantageously may be a radius transition, i.e., an utterly narrow and concavely arched surface. Furthermore, the two part surfaces 151, 152 are identical, although mirror-inverted, hence it follows that the borderline 153 is situated in the neutral plane NP of the milling insert. In the example, the angle λ between the two V-shapedly converging part surfaces 151, 152 becomes 170°.

The angle η may of course deviate upward as well as downward from the above-mentioned value of 85°. However, in the embodiment η should amount to at least 72° (θ=18°) and at most 89° (θ=1°).

Figure 12:
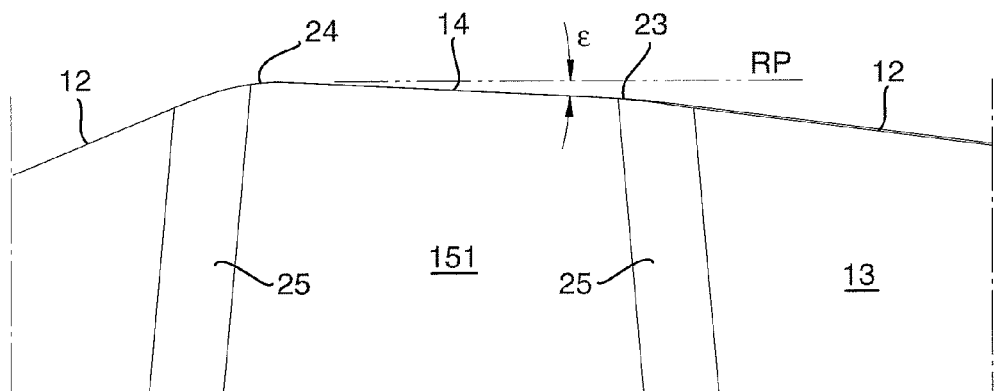
FIG. 12 is a detailed section made on a much enlarged scale illustrating the individual secondary edge of the milling insert.

In FIGS. 11 and 12, in which the milling insert is viewed in the direction of the bisector B in FIG. 6, it is seen how the individual secondary edge 14 of the milling insert according to the embodiment is inclined at a moderate angle ε in relation to the reference plane RP, more precisely in such a way that that end or point 23, which connects to the main edge 12, is situated at a lower level than the opposite end or point 24. In the example, the angle ε between the secondary edge and the plane RP amounts to 3°. In this connection, it should be pointed out that the cutting edges 12, 14 transform into each other via one or more radius transitions of the traditional type. In the example, such a radius transition 25 is shown in the form of a thin, convex surface situated between the clearance surfaces 13, 15 of the cutting edges. The described inclination of the secondary edge 14 entails that the most exposed part of the milling insert, viz. the corner transition between the secondary edge and the main edge, will lack the abrupt bob that will be the result when the cutting edges—as viewed in side view—mutually form an angle considerably smaller than 180°. More precisely, the secondary edge 14 and the main edge 12 transform into each other along an essentially straight (or utmost slightly cambered) cutting edge line as viewed from the side in the view according to FIG. 11. In other words, the two cutting edge lines transform into each other along an utmost slightly curved and thereby harmonious transition line, which strengthens the corner transition and imparts the milling insert an increased service life.

Although ε in the example amounts to exactly 3°, this angle may vary provided that it amounts to at least 1°. On the other hand, the angle should not be more than 7°. Advantageously, the angle ε is within the range of 2°-5°.

To the naked eye, the secondary edge 14 appears as being straight, not only in the planar view according to FIG. 6, but also in the enlarged side view according to FIG. 12. However, in practice, the secondary edge may have another shape than truly linear, at least in one of the co-ordinate directions. In particular, the same may be convexly arched as viewed in planar view according to FIG. 6, a straight line between the end points 23 and 24 forming a chord of the arc line that constitutes the secondary edge, the chord being decisive for the angle ε. It is also feasible to give the cutting edge line 14 a slightly convex shape as viewed in side view according to FIGS. 11 and 12.

By forming, in the above-described way, the surface-wiping secondary edge 14 with a certain, convex arching or camber, the generated, plane surface of the workpiece can be given an advantageous surface structure. Instead of leaving diminutive, lowered chutes or ditches in the surface, as is the case when the secondary edge is straight and transforms into the main edge via a comparatively acute bob, diminutive crests invisible to the eye are formed between, in other respects, utmost slightly concave surface fields, which together are experienced as a planar and smooth surface.

Here, it should be pointed out that the individual reference plane RP is orientated in such a way that the highest situated end points 24 of all four secondary edges 14 are situated in the plane RP. In other words, the level of the plane RP in relation to the neutral plane NP is determined by the axial distance between the individual end point 24 and the neutral plane NP.

Although the cutting edges 11 described above per se could be sharp, e.g., by grinding, the same are in the preferred embodiment formed with so-called reinforcement bevels 26 (see FIG. 4), i.e., utterly narrow surfaces of the upperside and the underside in the immediate proximity of the respective clearance surfaces. In this connection, it should also be mentioned that the milling insert may be directly pressed in so far that it obtains the final shape thereof directly after pressing and sintering, and without needing to be after-treated by grinding or the like.

In the shown, preferred embodiment, each one of the clearance surfaces 13 adjacent to the main edges 12 is planar and extends perpendicularly to the neutral plane. This means that the borderlines 27 against the part surfaces 151, 152 of the corner surface will run in a slightly V-shaped fashion in relation to each other. In this case, the individual borderline 153 is somewhat longer than each one of the secondary edges 14. In addition, it should be noted that the borderline 153 is parallel to each one of the two secondary edges 14. Hence it follows that the borderline 153 forms the same angle ε with the neutral plane NP as the individual secondary edge 14 forms with the reference plane RP.

As viewed in FIG. 8, the V-formation formed by the part surfaces 151, 152 may be said to form a waist, the deepest situated part of which is the borderline 153. In other words, the part surfaces 151,152, as viewed in FIG. 8, may be said to lean generally inward toward the center axis C2 of the milling insert. The depth d with which the bottom of the waist, i.e., the borderline 153, is countersunk in relation to the plane VP common to the secondary edges 14 is in this embodiment influenced, among other things, by the thickness T of the milling insert (see FIG. 7) and the angles θ of the part surfaces. If θ is great, d becomes great, and vice versa. In the embodiment, d may be within the range of 0.04-0.80 mm.

Figure 9:
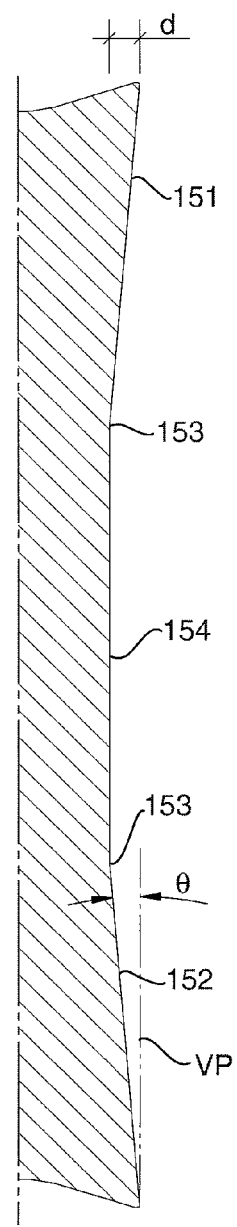
FIG. 9 is an analogous detailed section showing an alternative embodiment of the clearance surface.

In FIG. 9, an alternative embodiment of a milling insert is shown, the corner surfaces 15 of which still have a generally concave shape, but wherein the two part surfaces 151, 152 are spaced-apart by an intermediate surface 154, towards which they border via borderlines or radius transitions 153. The surfaces 151, 152 and 154 may be either planar, as is illustrated in FIG. 9, or concavely arched. For instance, the individual part surfaces 151, 152 could be concavely arched at the same time as the intermediate surface 154 is plane. Also the opposite relationship is feasible. In addition, it is feasible to form the corner surface in its entirety in the form of a concavely arched surface having a comparatively large radius. Furthermore, it is feasible to impart the corner surface with the concave shape by a plurality of different part surfaces having different radii, however, provided that the two part surfaces present closest to the secondary edges have the same radius and the same angle η.

Suitably, the milling insert according to the invention may be manufactured by multiaxial pressing (MAP), the powder compound in question being pressed not only between two stamps, which in a conventional way are pressed vertically against the uppersides and undersides of the green ware to be made, but also between at least two additional stamps, which are pressed against the sides or clearance surfaces of the body. In order to, after finished pressing, facilitate removal of the two horizontally operating stamps and avoid damage to the clearance surfaces of the green ware, the milling insert may be made in accordance with the two embodiments exemplified in FIGS. 13-14 and FIGS. 15-17, respectively.

Characteristic of the two embodiments according to FIGS. 13-17 is that each one of two diametrically opposed clearance surfaces is broken by including two surface fields, which mutually—as viewed in planar view of arbitrary planes parallel to the neutral plane NP—form an angle greater than 180°, and which are spaced-apart from each other via a turning line that extends between the upperside and underside of the milling insert.

Figure 13:
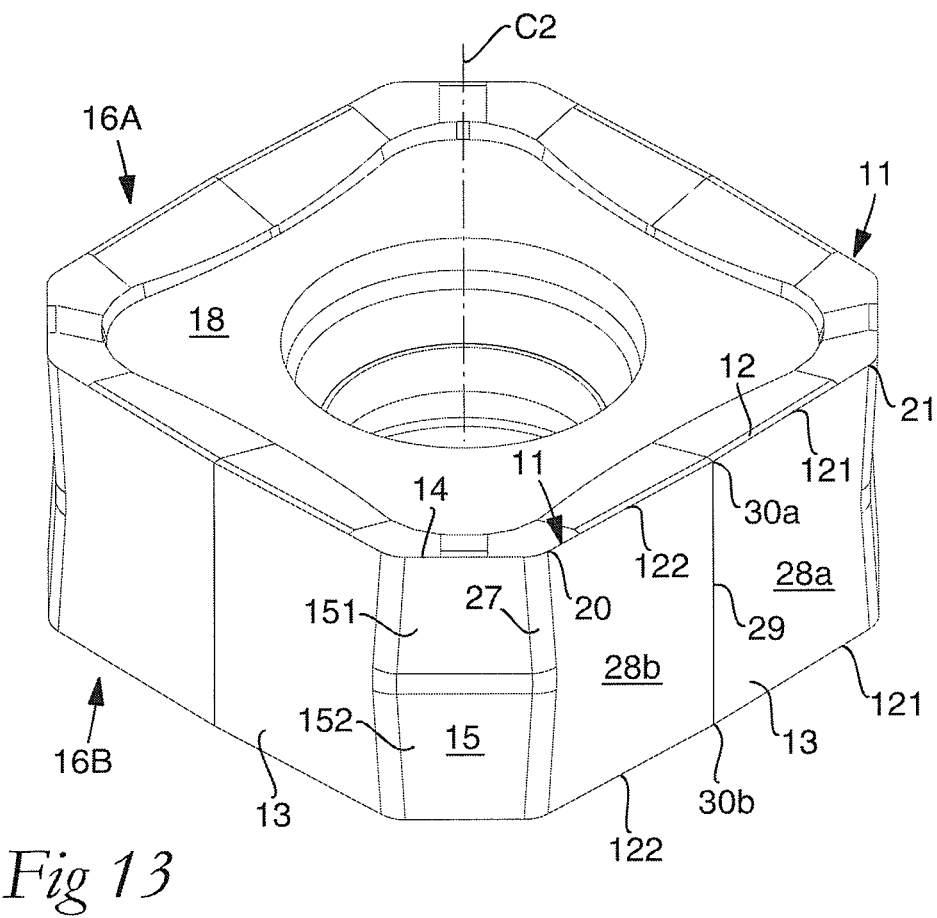
FIG. 13 is a perspective view showing a second, alternative embodiment of the milling insert according to the invention.
Figure 14:
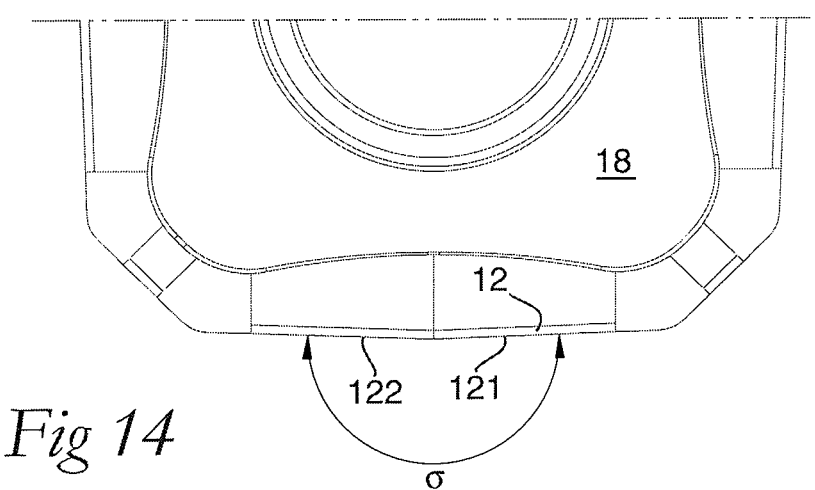
FIG. 14 is a partial planar view showing how the clearance surface adjacent to a main edge is broken.

In the embodiment according to FIGS. 13 and 14, the broken surfaces include the clearance surfaces 13 adjacent to the main edges 12. Although only one pair of diametrically opposed clearance surfaces is necessary to facilitate the removal of the side stamps, in this case, all four clearance surfaces 13 have been made in the form of broken surfaces in which two surface fields 28*a*, 28*b* are included, which are spaced-apart by a borderline 29. In such a way, the milling insert becomes symmetrical. In the example, the surface fields 28*a*, 28*b* are planar and the borderline 29 straight, the last-mentioned one extending between the uppersides and undersides 16A, 16B of the milling insert, more precisely between opposite end points 30*a*, 30*b*. Each such turning point also forms a transition between two part edges 121, 122, which together form the main edge 12. The angle σ between the surface fields 28*a*, 28*b* (and thereby also between the part edges 121 and 122) is, as has been pointed out above, greater than 180°, and amounts in the example to 184°. In practice, the angle σ may vary but should, however, amount to at least 180.5° and at most 190°. Advantageously, σ may be within the range of 181-186° or 183-185°.

In the example according to FIGS. 13 and 14, the borderline 29 is located halfway between the ends of the main edge 12 such as these are constituted by the end points 20, 21. This means that the surface fields obtain identical, although mirror-inverted, contour shape, and that the two the edge sections 121, 122 become equally long.

By forming the milling insert in the way described above with at least one pair of diametrically opposed clearance surfaces in the form of broken surfaces, two diametrically opposed, horizontally operating stamps can be retracted in a linear path of motion from the finish-pressed green ware in such a way that each point on the stamp surfaces, which determines the shape, immediately clears from the green ware without scraping any surface of the same. In other words, the design of the milling insert guarantees a good surface quality, something that in turn allows manufacture of directly pressed, non-ground milling inserts having good dimensional accuracy.

Figure 15:
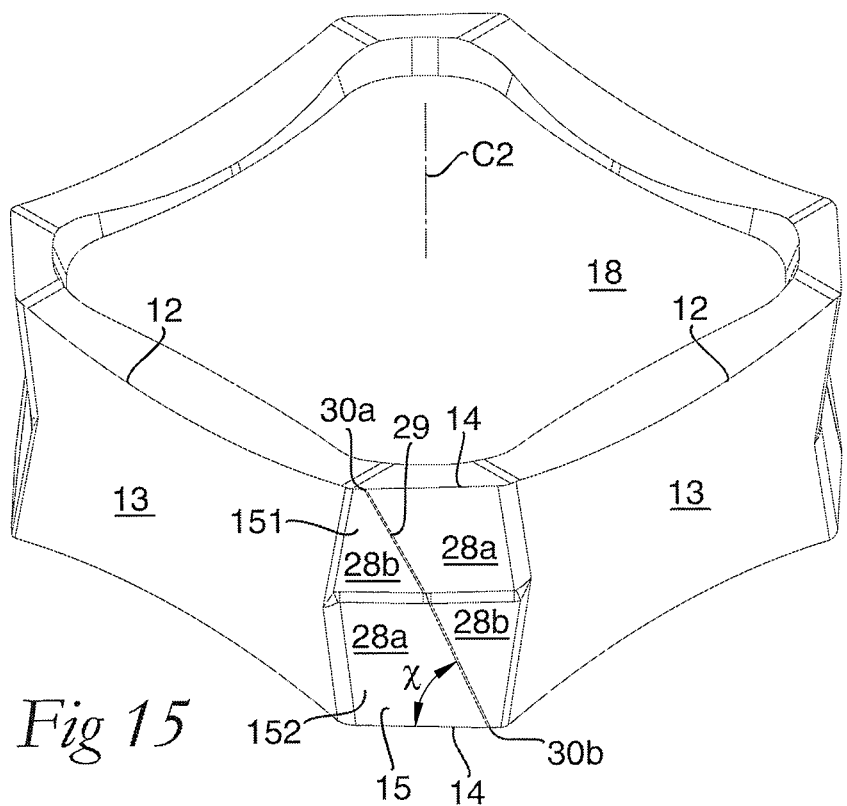
FIG. 15 is a perspective view showing a third, alternative embodiment showing how corner surfaces of the milling insert are broken.
Figure 16:
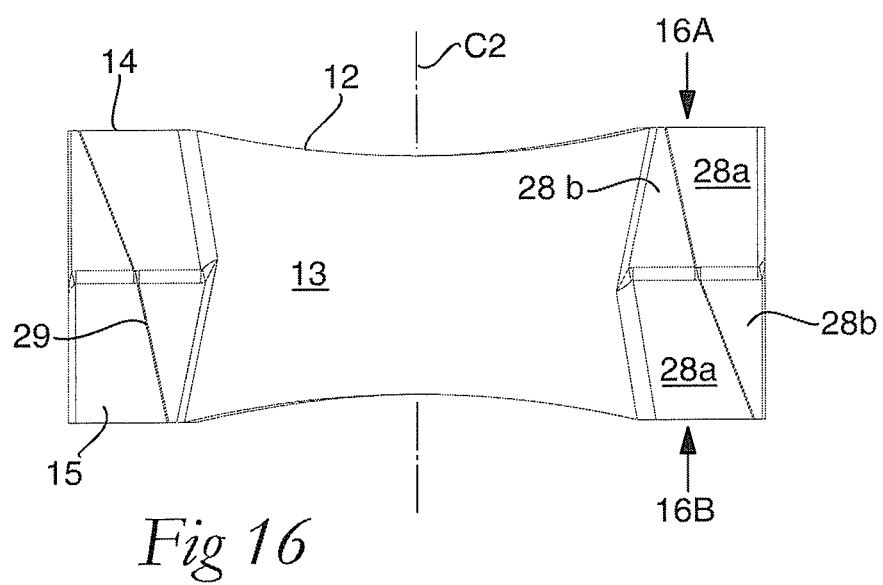
FIG. 16 is an end view of the milling insert according to FIG. 15.
Figure 17:
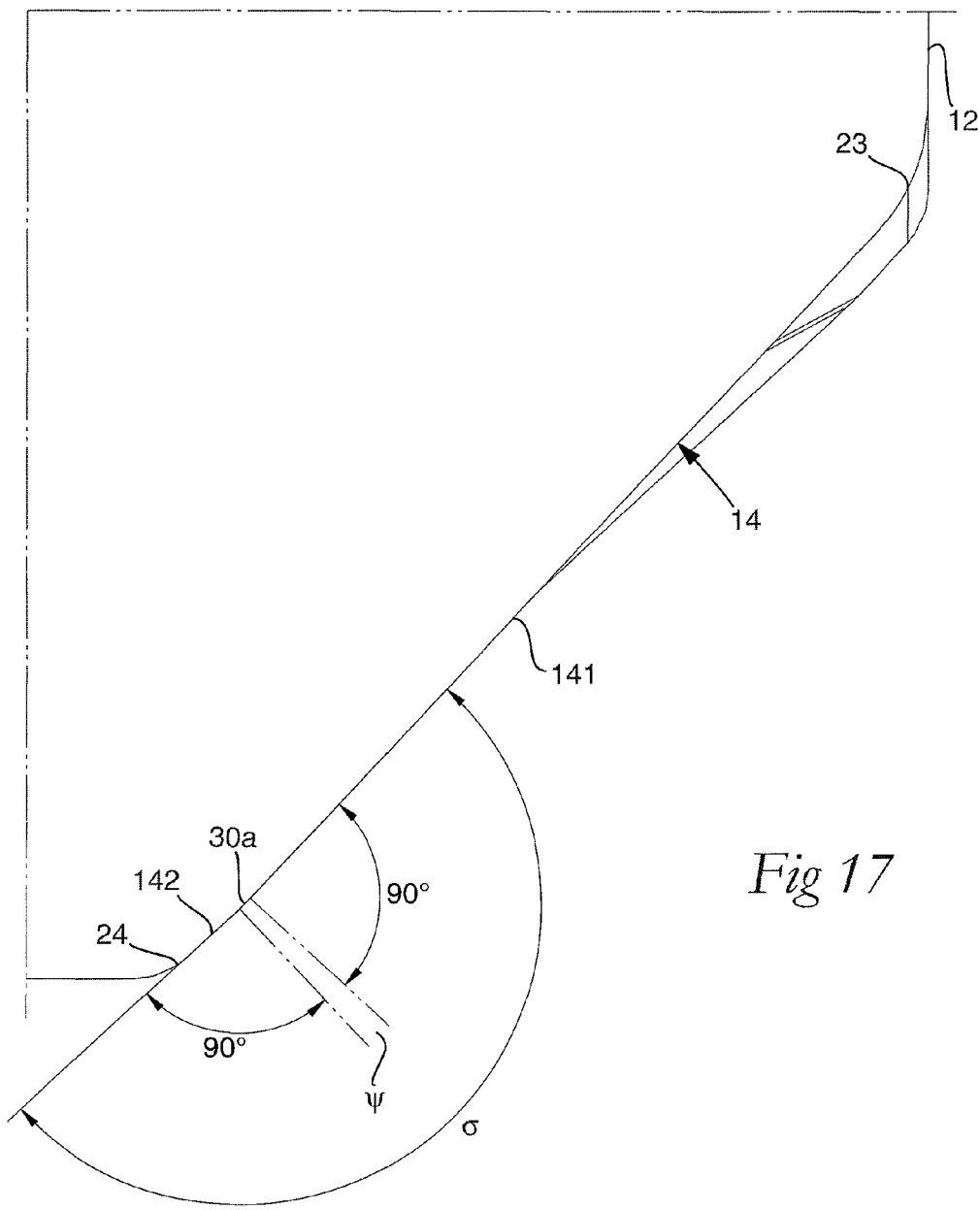
FIG. 17 is an enlarged detailed view showing the contour shape of a secondary edge included in the milling insert according to FIGS. 15 and 16.

In the embodiment according to FIGS. 15-17, the individual corner surface 15, which forms a clearance surface adjacent to the secondary edges 14, is broken in accordance with the embodiment. More precisely, each one of the two part surfaces 151, 152, which together form the corner surface 15, is broken along a common borderline 29, which in each part surface separates two surface fields 28a, 28b. Also in this case, the surface fields 28a, 28b are planar and the borderline 29 straight. In contrast to the previously described embodiment, however, the milling insert according to FIGS. 15-17 is formed in such a way that the borderline 29 runs at an acute angle χ to the secondary edge 14, approximately diagonally across the corner surface 15. Therefore, the two points 30a, 30b that form the ends of the borderline 29 will also in this case form turning points along each one of the secondary edges 14. More precisely, the point 30a forms a turning point (see FIG. 17) between a first edge section 141, which is longer than a second edge section 142. In the shown, preferred example, the turning point 30a is situated very close to one end of the secondary edge 14, whereby the length of the second edge section 142 is only a fraction of the length of the first edge section 141. In the example, the total length of the secondary edge 14 is determined by the distance between the end points 23 and 24, the length (lacking designation) of the edge section 141 between the points 30a and 23 being more than ten times greater than the length of the edge section 142 between the points 30a and 24. This means that the major part of the total length of the secondary edge can efficiently be utilized for the surface-wiping function thereof on the plane surface generated by the connecting, chip-removing main edge 12. In practice, the length of the edge section 141 should be at least five, suitably at least ten times greater than the length of the edge section 142.

To elucidate the angle between the edge sections 141, 142 (and the surface fields 28a, 28b), two dash-dotted lines have been drawn-in in FIG. 17 and that form a 90° angle with the respective edge section, the angle between these lines have been designated ψ. In the example, ψ amounts to 4.24°, hence it follows that σ in this case amounts to 184.24°.

In this connection, it should be pointed out that the borderline 29 also may be located entirely diagonally, i.e., so that the end points 30a, 30b thereof coincide with the opposite end points of the secondary edges 14. In such a way, the edge section 142 is eliminated while keeping an entirely straight secondary edge 14.

By imparting, in the way described above, the individual corner surface between a pair of upper and lower secondary edges a concave shape, the axially negative tipping in of the milling insert (see FIG. 2) can be reduced most considerably. The fact that the corner surfaces are shaped as concave waists entails per se a certain reduction of the material (the cemented carbide) of the milling insert, but because the clearance surfaces of the main edges in the preferred embodiment are still planar and extend perpendicularly to the neutral plane of the milling insert, said material reduction will be negligible for the total strength of the milling insert, wherein it should be taken into consideration that the stresses on the chip-removing main edges are considerably greater than the stresses on the secondary edges, which only have the purpose of wiping off the generated surface. Another advantage of the milling insert according to the invention is that the most sensitive portions of the milling insert, viz. the corner transitions between the co-operating secondary edges and the main edges are strengthened most considerably by the fact that the secondary edges have been inclined in relation to the neutral plane. By making the milling insert with broken clearance surfaces according to FIGS. 13-17, the concave shape of the corner surfaces can be provided without the surface finish and dimensional accuracy of the milling insert being jeopardized. Another advantage is that the design of the milling insert offers the possibility of adapting the clearance under the secondary edge to specific applications, in which the machined material requires an enlarged clearance, without the mounting of the milling insert in the milling cutter body being affected.

While the invention has been disclosed with reference to certain preferred embodiments, numerous modifications, alterations, and changes to the described embodiments are possible without departing from the sphere and scope of the invention, as defined in the appended claims and their equivalents thereof. For example, in the embodiment illustrated in FIGS. 1-8, the upper and lower part surfaces 151, 152 of the corner surface 15 are planar. In alternative embodiments, it is feasible to form the part surfaces arched, convexly or concavely—provided that the part surfaces 151, 152 present closest to the secondary edges form an acute angle η with each reference plane RP. In such embodiments having arched part surfaces, the angle η is defined as the angle that a tangent to the individual part surface closest to the secondary edge forms with the reference plane RP. Accordingly, it is intended that the invention not be limited to the described embodiments, but that it have the full scope defined by the language of the following claims.

What is claimed is:

1. A double-sided, indexable face milling insert, comprising:
   an upperside, an underside, and a neutral plane (NP) parallel to the upperside and the underside, the neutral plane forming a right angle with a geometrical center axis (C2);
   a plurality of indexable cutting edges formed along circumferential borderlines in transitions between a number of clearance surfaces and the upperside as well as the underside, each cutting edge including a chip-removing main edge and a surface-wiping secondary edge, the secondary edge forming an obtuse angle with the main edge in planar view; and
   a corner clearance surface extending between and connecting each pair of upper and lower secondary edges, the corner clearance surface including first and second part surfaces which each form an acute angle (η) in side elevation view with respective reference planes (RP) parallel to the neutral plane,
   wherein the first and second part surfaces are located on opposite sides of the neutral plane, and
   wherein the clearance surface between a pair of upper and lower main edges is planar and extends perpendicularly to the neutral plane (NP).

2. The face milling insert according to claim 1, wherein each part surface is planar.

3. The face milling insert according to claim 1, wherein the first and second part surfaces are spaced apart by at least one intermediate surface.

4. The face milling insert according to claim 1, wherein the intermediate surface is planar and transforms into the first and second part surfaces via straight borderlines.

5. A double-sided, indexable face milling insert, comprising:
   an upperside, an underside, and a neutral plane (NP) parallel to the upperside and the underside, the neutral plane forming a right angle with a geometrical center axis (C2);
   a plurality of indexable cutting edges formed along circumferential borderlines in transitions between a number of clearance surfaces and the upperside as well as the underside, each cutting edge including a chip-removing main edge and a surface-wiping secondary edge, the secondary edge forming an obtuse angle with the main edge in planar view; and a corner clearance surface extending between and connecting each pair of upper and lower secondary edges, the corner clearance surface including first and second part surfaces which each form an acute angle ($\eta$) in side elevation view with respective reference planes (RP) parallel to the neutral plane, wherein the first and second part surfaces are included in one single continuous corner surface having a concavely arched shape.

6. A double-sided, indexable face milling insert, comprising:

an upperside, an underside, and a neutral plane (NP) parallel to the upperside and the underside, the neutral plane forming a right angle with a geometrical center axis (C2);

a plurality of indexable cutting edges formed along circumferential borderlines in transitions between a number of clearance surfaces and the upperside as well as the underside, each cutting edge including a chip-removing main edge and a surface-wiping secondary edge, the secondary edge forming an obtuse angle with the main edge in planar view; and a corner clearance surface extending between and connecting each pair of upper and lower secondary edges, the corner clearance surface including first and second part surfaces which each form an acute angle ($\eta$) in side elevation view with respective reference planes (RP) parallel to the neutral plane, wherein each secondary edge is inclined at an angle ($\epsilon$) in relation to the reference planes in side view, such that one end of the secondary edge connected to the co-operating main edge is situated at a lower level closer to the neutral plane than the other opposite end of the secondary edge.

7. The face milling insert according to claim 6, wherein the angle ($\epsilon$) amounts to at least 1°.

8. The face milling insert according to claim 7, wherein the angle ($\epsilon$) amounts to at most 7°.

9. A double-sided, indexable face milling, comprising:

an upperside, an underside, and a neutral plane (NP) parallel to the upperside and the underside, the neutral plane forming a right angle with a geometrical center axis (C2);

a plurality of indexable cutting edges formed along circumferential borderlines in transitions between a number of clearance surfaces and the upperside as well as the underside, each cutting edge including a chip-removing main edge and a surface-wiping secondary edge, the secondary edge forming an obtuse angle with the main edge in planar view; and a corner clearance surface extending between and connecting each pair of upper and lower secondary edges, the corner clearance surface including first and second part surfaces which each form an acute angle ($\eta$) in side elevation view with respective reference planes (RP) parallel to the neutral plane, wherein each one of two diametrically opposed clearance surfaces includes two surface fields, which in planar view form a turning angle ($\sigma$) being greater than 180°, and which are delineated from each other via a borderline that extends between the upperside and the underside.

10. The face milling insert according to claim 9, wherein the turning angle ($\sigma$) amounts to at least 180.5°.

11. The face milling insert according to claim 10, wherein the turning angle ($\sigma$) amounts to at most 190°.

12. The face milling insert according to claim 9, wherein the borderline runs parallel to the center axis.

13. The face milling insert according to claim 9, wherein the borderline runs at an acute angle ($\chi$) to a connecting secondary or main edge.

14. The face milling insert according to claim 13, wherein each of the two diametrically opposed clearance surfaces is in the form of a corner surface between a pair of upper and lower secondary edges.

15. The face milling insert according to claim 14, wherein the borderline extends between a pair of opposite ends, each end forming a turning point between first and second edge sections included in the respective upper and lower secondary edge, the first edge section being longer than the second edge section and connecting to a co-operating main edge.

16. A double-sided, indexable face milling insert, comprising:

an upperside, an underside, and a neutral plane (NP) parallel to the upperside and the underside, the neutral plane forming a right angle with a geometrical center axis (C2);

a plurality of indexable cutting edges formed along circumferential borderlines in transitions between a number of clearance surfaces and the upperside as well as the underside, each cutting edge including a chip-removing main edge and a surface-wiping secondary edge, the secondary edge forming an obtuse angle with the main edge in planar view; and a corner clearance surface extending between and connecting each pair of upper and lower secondary edges, the corner clearance surface including first and second part surfaces which each form an acute angle ($\eta$) in side elevation view with respective reference planes (RP) parallel to the neutral plane, wherein the first and second part surfaces transform into each other via a borderline, wherein the borderline is situated in the neutral plane, and wherein the clearance surface between a pair of upper and lower main edges is planar and extends perpendicularly to the neutral plane (NP).

17. The face milling insert according to claim 16, wherein the first and second part surfaces form an obtuse angle in side elevation view with respective reference planes (RP) parallel to the neutral plane.

18. The face milling insert according to claim 16, wherein each part surface is planar.

* * * * *